United States Patent
Gaucher et al.

(10) Patent No.: US 9,496,714 B2
(45) Date of Patent: Nov. 15, 2016

(54) HIERARCHIC MACROSCOPIC INCENTIVIZATION FOR ELECTRIC UTILITY LOAD BALANCING

(71) Applicant: International Business Machines Corporation, Armonk, NY (US)

(72) Inventors: Brian P. Gaucher, New Milford, CT (US); Jonathan Lenchner, North Salem, NY (US); Maharaj Mukherjee, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 781 days.

(21) Appl. No.: 13/738,487

(22) Filed: Jan. 10, 2013

(65) Prior Publication Data

US 2014/0191575 A1     Jul. 10, 2014

(51) Int. Cl.
  *H02J 3/00* (2006.01)
  *H02J 3/14* (2006.01)
  *H02J 13/00* (2006.01)

(52) U.S. Cl.
  CPC .............. *H02J 3/14* (2013.01); *H02J 13/0062* (2013.01); *H02J 13/0079* (2013.01); *Y02B 70/3225* (2013.01); *Y04S 20/222* (2013.01); *Y04S 20/224* (2013.01); *Y10T 307/461* (2015.04)

(58) Field of Classification Search
  None
  See application file for complete search history.

(56) References Cited

U.S. PATENT DOCUMENTS

| | | |
|---|---|---|
| 6,774,506 B2 | 8/2004 | Hashimoto et al. |
| 7,983,798 B2 * | 7/2011 | Boss et al. ................. 700/296 |
| 2003/0225661 A1 | 12/2003 | Peljto |
| 2010/0179862 A1 | 7/2010 | Chassin et al. |
| 2012/0029720 A1 | 2/2012 | Cherian et al. |
| 2012/0078687 A1 | 3/2012 | Ghosh et al. |
| 2012/0271470 A1 | 10/2012 | Flynn et al. |
| 2013/0046668 A1 * | 2/2013 | Al Faruque et al. .......... 705/35 |
| 2013/0173500 A1 * | 7/2013 | Baek .......................... 705/412 |

OTHER PUBLICATIONS

T. Cui, et al., "Concurrent Optimization of Consumer's Electrical Energy Bill and Producer's Power Generation Cost under a Dynamic Pricing Model," 2012 IEEE PES Innovative Smart Grid Technologies (ISGT), Jan. 16-20, 2012; 6 pages.
E. Karangelos, et al., "A Cooperative Game Theory Approach to Wind Power Generation Imbalance Cost Allocation," 17th Power Systems Computation Conf., Stockholm, Aug. 22-26, 2011; 7 pages.

* cited by examiner

*Primary Examiner* — Jared Fureman
*Assistant Examiner* — Aqeel Bukhari
(74) *Attorney, Agent, or Firm* — Cantor Colburn LLP; Kurt Goudy (57) ABSTRACT

A method of balancing a demand for electricity is disclosed. Consumers of the electricity are organized into a hierarchical set of nodes. A demand for a node at a first level of the hierarchy is defined. A rate structure is defined at nodes of a second level of the hierarchy so that a sum of the electricity demands at the second level obtained in response to the defined rate structure is substantially the same as the defined demand at the first level.

22 Claims, 8 Drawing Sheets

|  | 12 - 3 AM | 3 - 6 AM | 6 - 9 AM | 9 - 12 NOON | 12 - 3 PM | 3 - 6 PM | 6 - 9 PM | 9 PM - 12 | SUM |
|---|---|---|---|---|---|---|---|---|---|
| NEIGHBORHOOD 1 | $1.51 | $1.51 | $2.65 | $2.27 | $2.65 | $2.65 | $2.65 | $2.65 | $18.52 |
| NEIGHBORHOOD 2 | $6.12 | $6.58 | $9.53 | $8.16 | $7.71 | $5.90 | $6.12 | $6.58 | $56.70 |
| NEIGHBORHOOD 3 | $5.20 | $4.90 | $4.59 | $5.20 | $5.20 | $5.20 | $5.20 | $4.90 | $40.39 |
| TOWN | $12.84 | $12.99 | $16.76 | $15.63 | $15.56 | $13.74 | $13.97 | $14.12 | $115.61 |

FIG. 6

| 701 TOWN | 702 | 703 | 704 | 705 12-3AM | 706 3-6AM | 707 6-9AM | 708 9-12 NOON | 709 12-3PM | 710 3-6PM | 711 6-9PM | 712 9PM-12 | 713 TOTAL |
|---|---|---|---|---|---|---|---|---|---|---|---|---|
| MY TOWN | NEIGHBORHOOD 1 | | | | | | | | | | | |
| | | A STREET | | | | | | | | | | |
| | | | SMITH'S HOME | 1 | 5 | 6 | 3 | | | 4 | 3 | 24 |
| | | | WILSON'S HOME | 1 | 1 | 6 | 3 | | 1 | 3 | | 24 |
| | | B STREET | | | | | | | | | | |
| | | | WANG'S HOME | 1 | 1 | 1 | 3 | 6 | 6 | 3 | 4 | 25 |
| | | C STREET | | | | | | | | | | |
| | | | PETER'S HOME | 5 | 1 | 1 | 3 | 6 | 1 | 4 | 4 | 25 |
| | TOTAL | | 721 | 8 | 8 | 14 | 12 | 14 | 14 | 14 | 14 | 98 |
| | NEIGHBORHOOD 2 | | | | | | | | | | | |
| | | D STREET | | | | | | | | | | |
| | | | OSAKA'S SUSHI RESTAURANT | 9 | 5 | 2 | 10 | 10 | 10 | 6 | 1 | 53 |
| | | | LIN'S CHINESE RESTAURANT | 9 | 5 | 10 | 2 | 10 | 10 | 6 | 1 | 53 |
| | | E STREET | | | | | | | | | | |
| | | | MY TOWN TOWN HALL | 1 | 1 | 10 | 7 | | 2 | 5 | 9 | 48 |
| | | F STREET | | | | | | | | | | |
| | | | LYNNE'S BAIL BOND OFFICE | 4 | 9 | 10 | | 2 | 2 | 5 | 9 | 48 |
| | | | MUKHERJEE'S LAW OFFICE | 4 | 9 | 10 | 7 | 2 | 2 | 5 | 9 | 48 |
| | TOTAL | | 722 | 27 | 29 | 42 | 36 | 34 | 26 | 27 | 29 | 250 |

FROM FIG. 7A

| | | | | | | | | | | |
|---|---|---|---|---|---|---|---|---|---|---|
| NEIGHBORHOOD 3 | | | | | | | | | | |
| | G STREET | LENCHNER'S ROBOTICS | 12 | 10 | 12 | 10 | 14 | 10 | 10 | 12 | 88 |
| | H STREET | GAUCHER'S ELECTRICAL | 10 | 12 | 10 | 14 | 10 | 10 | 12 | 10 | 88 |
| | I STREET | ZHUCKERMAN'S COMPUTERS | 12 | 10 | 10 | 10 | 14 | 12 | 10 | 10 | 88 |
| TOTAL | | | 34 | 32 | 30 | 34 | 34 | 32 | 32 | 264 | |
| | | | 69 | 69 | 86 | 82 | 82 | 74 | 75 | 75 | 612 |

723 (TOTAL row), 724, 725 (612)

TOTAL

HIERARCHIC MACROSCOPIC INCENTIVIZATION FOR ELECTRIC UTILITY LOAD BALANCING

BACKGROUND

The present invention relates to electric utility systems, and more specifically, to a method of balancing loads on an electrical grid.

Electric utility companies are interested in providing a supply of electricity that meets as closely as possible the demands of its consumers. Demand generally fluctuates significantly throughout the day, with large energy consumption during daylight hours and small energy consumption at night. In order to provide a supply of electricity that meets this fluctuating energy demand, the utility companies generally ramp up and ramp down generators on a given schedule, incurring excess cost in the process. One attempt to reduce the fluctuations in energy demand is to introduce price incentives that encourage consumers to use more electricity during off-peak hours than during peak hours. However, these price incentives generally result in the creation of an additional peak in daily electricity consumption rather than creating a constant load or demand through the day.

SUMMARY

According to one embodiment of the present invention, a method of balancing a demand for electricity includes: organizing, using a processing device, consumers of the electricity into a hierarchical set of nodes; defining a demand for a node at a first level of the hierarchy; and defining a rate structure at nodes of a second level of the hierarchy, wherein a sum of the electricity demands at the second level obtained in response to the defined rate structure is substantially the same as the defined demand at the first level of the hierarchy.

According to another embodiment of the present invention, an electrical utility system for balancing an electricity demand includes a grid configured to provide electricity to a plurality of consumers; and a processor configured to: organize the plurality of consumers into a hierarchical set of nodes, define a demand at a node at a first level of the hierarchy, and define a rate structure at nodes of a second level of the hierarchy, wherein a sum of electricity demands for the nodes of the second level obtained in response to the defined rate structure is substantially the same as the defined demand at the first level of the hierarchy.

According to another embodiment of the present invention, a computer program product includes a computer readable storage medium having computer readable program code embodied therewith, the computer readable program code including instructions, that when executed by a computer, implement a method of balancing a demand for electricity, wherein the method includes: organizing consumers of the electricity into a hierarchical set of nodes; defining a demand for a node at a first level of the hierarchy; and defining a rate structure at nodes of a second level of the hierarchy, wherein a sum of the electricity demands at the second level obtained in response to the defined rate structure is substantially the same as the defined demand at the first level of the hierarchy.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

The present invention discloses a method of incentivizing consumers in a manner that obtains a substantially uniform load of electricity for the consumers as a group. The method includes creating and organizing a hierarchy of the consumers, the hierarchy having several nodes and branches that separates the consumers into logical groups. The largest, most general node is at the top of the hierarchy and the smallest, most specific nodes are at the bottom. In general, the bottom nodes represent individual consumers or consumer entities. A rate structure at a node of a given level is determined from a previously-defined rate structure at the next highest level of the hierarchy. In various embodiments, a rate structure may be defined as a rate charged for electricity as a function of time of day. A rate structure may be displayed as a piece-wise linear or continuous curve relating electricity cost to time of day. The process of determining rate structures for the nodes of the hierarchy begins at the highest level of the hierarchy and is repeated for each successively lower level of the hierarchy until the bottom level of the hierarchy (the consumers) is reached. Rate structures are assigned to each node of the level so that the sum of the demand obtained at the nodes in response to the rate structures is substantially equal to the desired demand for the related node at the next highest level of the hierarchy. The demand at a selected node may be indicated by a curve relating the amount of electricity used at the selected node as a function of time of day. The sum of the observed demand at a selected hierarchical level may be compared to a desired demand curve at the next higher hierarchical level and the rate structures may be suitably altered to provide an incentive to consumers to alter their time-based demand to address selected differences in the sum of the observed demands and the desired demand. Rate structure may alternately be referred to herein as incentive curve or electricity cost. Additionally, demand may alternately be referred to herein as a demand curve, a load or load curve.

Figure 1:
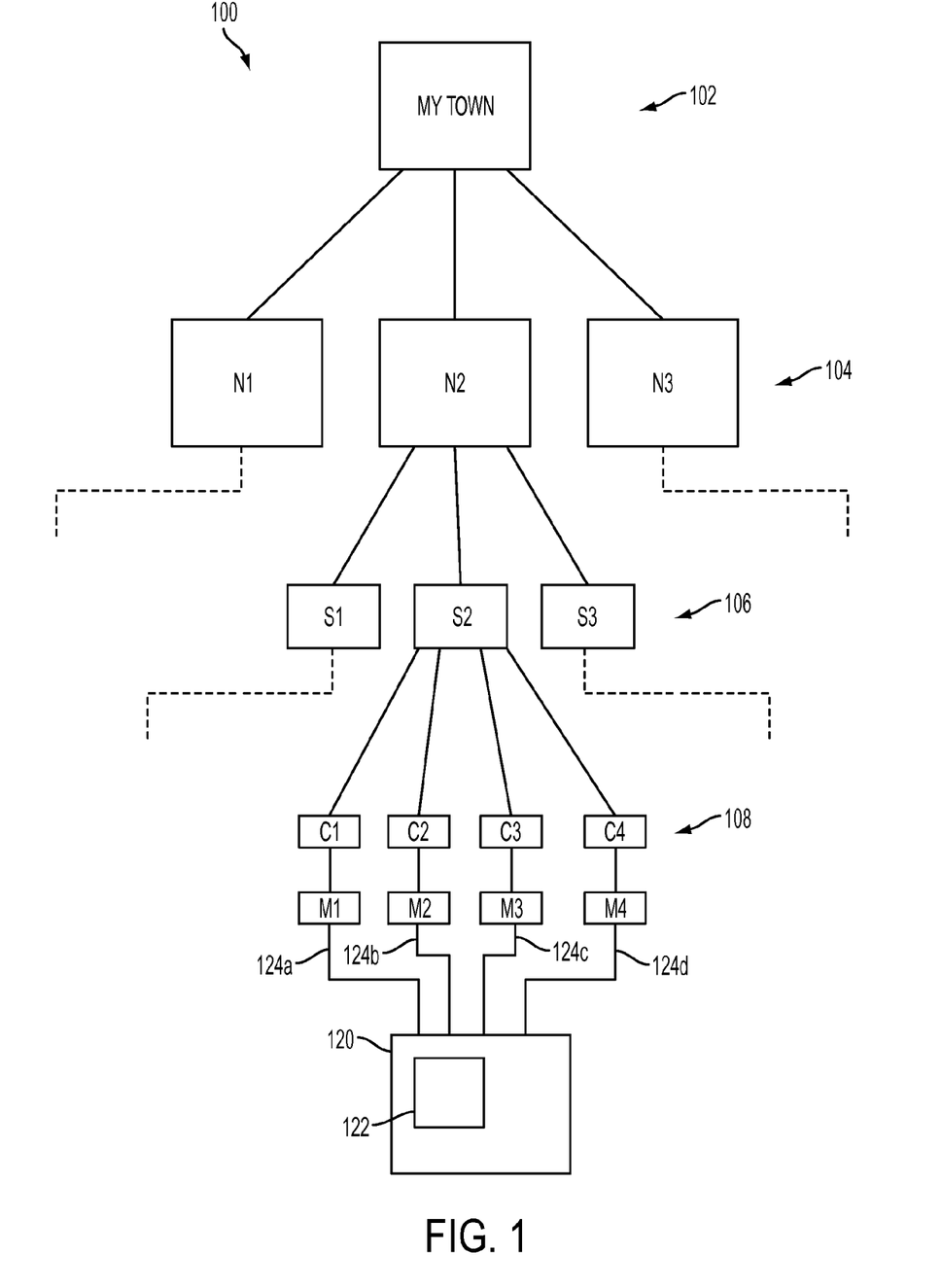
FIG. 1 shows an exemplary hierarchy or hierarchical tree for organizing electricity consumers according to one embodiment of the invention.

FIG. 1 shows an exemplary hierarchy 100 or hierarchical tree for organizing electricity consumers according to one embodiment of the invention. Each level of the hierarchy 100 organizes the consumers into nodes according to a logical grouping or definition. A consumer at the bottom level of the hierarchy 100 is also a member of a related node at each higher level of the hierarchy 100. In general, the first level 102 of the hierarchy, (shown as the top level in FIG. 1) is the most general grouping of the consumers and may include only one node. Each succeeding level (lower level) organizes the consumers into smaller, more specific, groups, as is discussed below. The exemplary hierarchy 100 includes four levels for illustrative purposes only. In alternate embodiments, the hierarchical tree may have any number of levels and any number of nodes may occur at each level.

The top level (first level) 102 of the hierarchical tree 100 includes a highest level grouping of consumers and represents a town, village, city, county, municipality, etc. The first level 102 is referred to hereinafter as a town for illustrative purposes. The second level 104 may group the consumers of the town into neighborhoods or any other logical grouping, suburb or zoning district such as residential, business, commercial, agricultural, medical, etc. The exemplary neighborhoods of the second level 104 are labeled N1, N2 and N3 for illustrative purposes, although in various embodiments, the second level 104 may include any number of neighborhoods. At the third level 106, consumers in a particular neighborhood of the second level 104 are organized by streets within the neighborhood. In the exemplary hierarchy 100, neighborhood N2 includes streets S1, S2 and S3 represented at the third level 106. Neighborhoods N1 and N3 similarly branch off to corresponding streets (not shown). Street S2 at the third level 106 includes consumers C1, C2, C3 and C4 at the fourth level 108. Streets S1 and S3 similarly branch off to corresponding consumers (not shown). A consumer may include, for example, a residence such as a house or an apartment, a factory, a business, a hospital, etc. Thus, the town at the first level 102 of the hierarchy is divided into districts at the second level 104 which, in turn, are divided into streets at the third level 106 which, in turn, are divided into the consumers at the fourth and lowest level 108.

The exemplary consumers C1, C2, C3 and C4 may have electricity meters M1, M2, M3 and M4, respectively associated with them. The electricity meters M1-M4 may be also referred to herein as smart meters. A smart meter may be a local computer at a consumer site that works as a hub in communication with a central processor, such as processor 122. In various embodiments, a selected smart meter may control the operation of several equipment and appliances at a consumer site, thereby ensuring that a substantially optimal load curve is not only determined but actually maintained by the equipment and appliances. The smart meters M1-M4 may also help find the substantially optimal load curves for the consumers that substantially minimize the overall cost. In another embodiment, the smart meters M1-M4 may provide a signal indicative of a power consumption of the consumers C1-C4 to a utility company 120 and display a rate structure to the consumers C1-C4. In one embodiment, a selected smart meter may display a curve to a selected consumer representing electricity cost, incentive curve or rate structure over a selected time span such as a 24-hour period. Therefore, the consumer has knowledge of when the electricity cost is low and when the electricity cost is high. The consumer may then decide to use a piece of electrical equipment at a time when electricity costs are low and to reduce such usage when electricity costs are high.

The meters M1-M4 may be in data communication with a processor 122 at a utility company 120 or other suitable location via communication links 124a-124d such as a web-based communication links or other suitable communication links. The rate structure may be provided to the smart meters M1-M4 from the utility company 120 over the communication links 124a-124d and may be updated in real-time to reflect current electricity prices. The processor 122 may read individual electricity demands for each consumer from the smart meters M1-M4, compile the demands for the plurality of consumers and determine the observed demand at each of the nodes of the hierarchy 100. The processor 122 may then compare the observed demand curve for a particular node to the desired demand curve for the particular node to determine an effectiveness of a rate structure in obtaining the desired demand curves. The processor 122 may alter rate structures in order to affect a consumer behavior such that the resulting consumer demand to the altered rate structures yields a substantially uniform demand curve at the highest node of the hierarchy 100.

In an exemplary embodiment, the present invention discloses a method of obtaining a balanced load or electricity demand at the first level of the hierarchical tree and thus a balanced load as seen by the utility company 120. A balanced load may refer to an electricity demand that is substantially uniform throughout the day. In an exemplary embodiment, a balanced load may be an electricity demand that varies less than a selected amount such as in a range from about 1% to about 10% or in a range from about 1% to about 20% over the course of a day. In an exemplary embodiment, an operator or processor 122 may select an incentive curve that may be applied to the first level of the hierarchy. The operator or processor 122 may then determine incentive curves at the neighborhoods of the second level. The summation of the incentive curves at the neighborhood level is equal to the incentive curve at the town level. This process may be repeated for each level of the hierarchy 100 until incentive curves are obtained for the consumers C1-C4.

Figure 2:
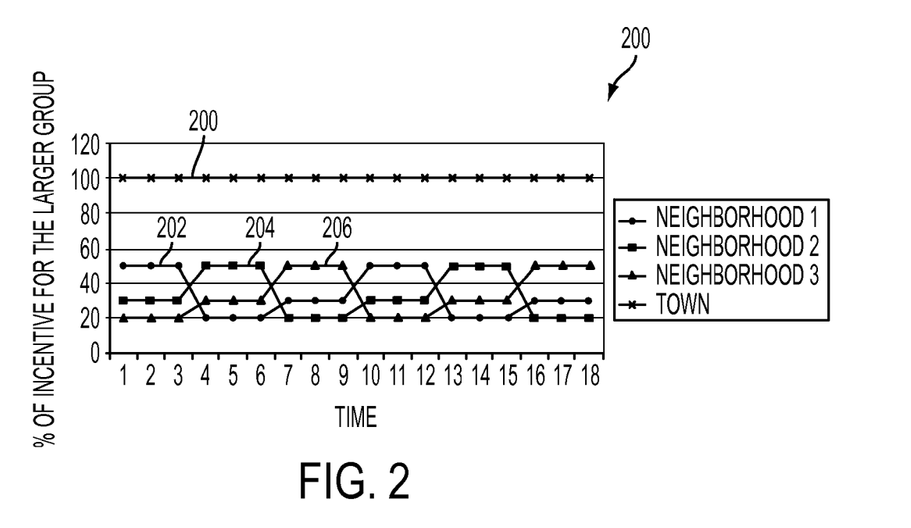
FIG. 2 shows exemplary incentive curves at a first and second level of a hierarchical rate structure in an exemplary embodiment of the present invention.

FIG. 2 shows exemplary incentive curves at a first and second level of a hierarchical rate structure in an exemplary embodiment of the present invention. FIG. 2 illustrates how a certain amount of incentive designated for a large group can be divided among smaller groups in order to keep the load for the large group substantially uniform. A graph 200 is shown displaying a percentage of incentive along a y-axis and time in hours along the x-axis. Incentive curve 202 shows an incentive for the first level ("My Town") 102. The incentive curve 202 is at a selected value (i.e., 100%) for the entire day because a balanced load is desired at the first level. Incentive curves 204, 206 and 208 are shown for neighborhood 1, neighborhood 2 and neighborhood 3, respectively, at the second level of the hierarchy. Each of the incentive curves 204, 206 and 208 vary throughout the day, such that at any time of the day, the sum of the incentives 204, 206 and 208 is equal to the incentive curve 202. For example, at time 1, the incentive for neighborhood 1 is 50%, the incentive for neighborhood 2 is 30% and the incentive for neighborhood 3 is 20%. The sum of these incentives at time 1 is 100% which is the value of incentive curve 202 at time 1. The incentive curve 202 is kept substantially uniform through out the day and portions of the incentive curve 202 are distributed to its constituting smaller groups in different amounts through out the day.

Figure 3:
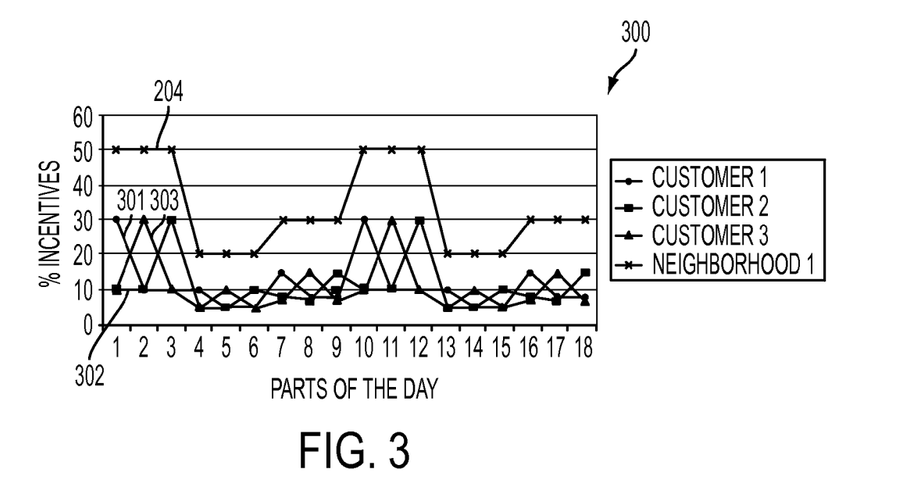
FIG. 3 shows exemplary incentive curves at a next lower level of the hierarchical rate structure illustrated in FIG. 2.

FIG. 3 shows exemplary incentive curves at a next lower level of the hierarchical rate structure illustrated in FIG. 2. The incentive curve 204 from FIG. 2 is reproduced in FIG. 3. Incentive curves 301, 302 and 303 are shown for consumer 1, consumer 2 and consumer 3, respectively. The sum of the incentive curves 301, 302 and 303 is equal to the incentive curve 204 at any selected time of day. For example, at time 1, the incentive for customer 1 is 30%, the incentive for customer 2 is 10% and the incentive for customer 3 is 10%. The sum of these incentives at time 1 is 50%, which is the value of incentive curve 204 at time 1.

Figure 4:
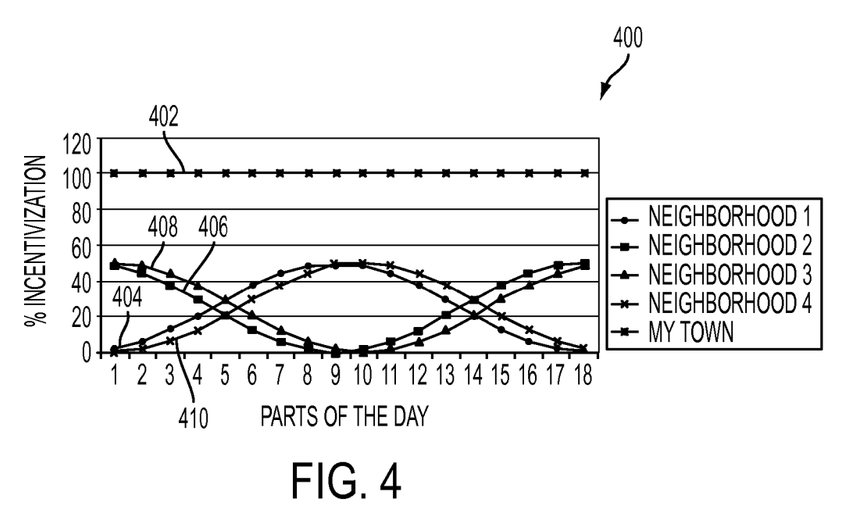
FIGS. 4 and 5 show set of continuous incentive curves that may be used in an alternative embodiment of the invention.
Figure 5:
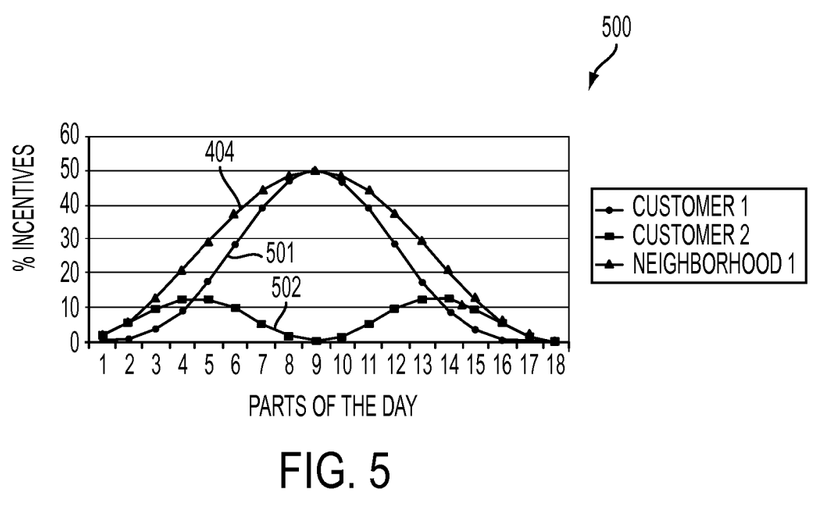

FIGS. 4 and 5 show another set of incentive curves that may be used in an alternative embodiment of the invention. Whereas the incentive curves of FIGS. 2 and 3 which are discontinuous, the incentive curves of FIGS. 4 and 5 are continuous.

FIG. 4 shows a graph 400 displaying a percentage of incentive along a y-axis and time in hours along the x-axis. Incentive curve 402 is shown for My Town 102. Incentive curves 404, 406, 408 and 410 are shown for neighborhood 1, neighborhood 2, neighborhood 3 and neighborhood 4, respectively. Each of the incentive curves 404, 406, 408 and 410 is selected to vary continuously such that at any time during the day, the sum of the incentive curves 404, 406, 408 and 410 is equal to the incentive curve 402.

FIG. 5 illustrates continuous incentive curves at a next lower level of the hierarchical rate structure illustrated in FIG. 4. The incentive curve 404 for neighborhood 1 from FIG. 4 is reproduced in FIG. 5. Incentive curves 501 and 502 are shown for customer 1 and customer 2, respectively. The sum of the incentive curves 501 and 502 is equal to the incentive curve 404 at any particular time of day.

Figure 6:
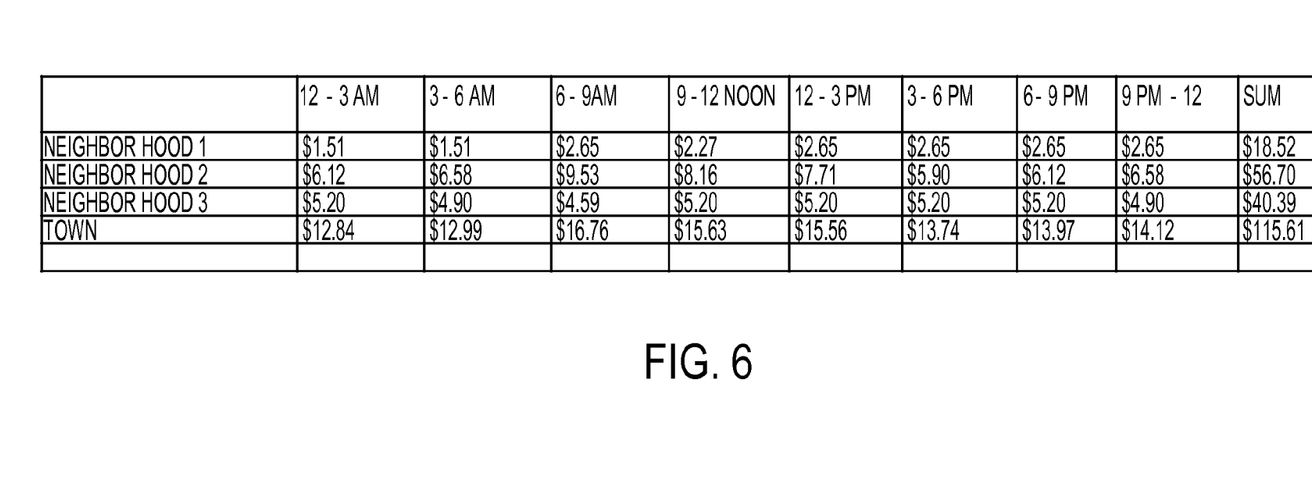
FIG. 6 shows an exemplary group-based rate structure that may be used in accordance with the present invention to balance an electrical load on an electricity grid.

FIG. 6 shows an exemplary group-based rate structure that may be used in accordance with the present invention to balance an electrical load on an electricity grid. The day is divided into eight 3-hour time spans: 12 midnight to 3 a.m.; 3 a.m. to 6 a.m.; 6 a.m. to 9 a.m.; 9 a.m. to 12 noon; 12 noon to 3 p.m.; 3 p.m. to 6 p.m.; 6 p.m. to 9 p.m.; and 9 p.m. to 12 midnight. In neighborhood 1, electricity costs are low from 12 midnight to 6 a.m. and is then at a substantially constant high cost for the rest of the day. In neighborhood 2, electricity costs are low from 12 midnight to 6 a.m. and from 3 p.m. to 12 midnight. Electricity costs for neighborhood 2 are high from 6 a.m. to 3 p.m. In neighborhood 3, electricity costs are substantially the same for all of the eight 3-hour time spans throughout the day.

Figure 7A:
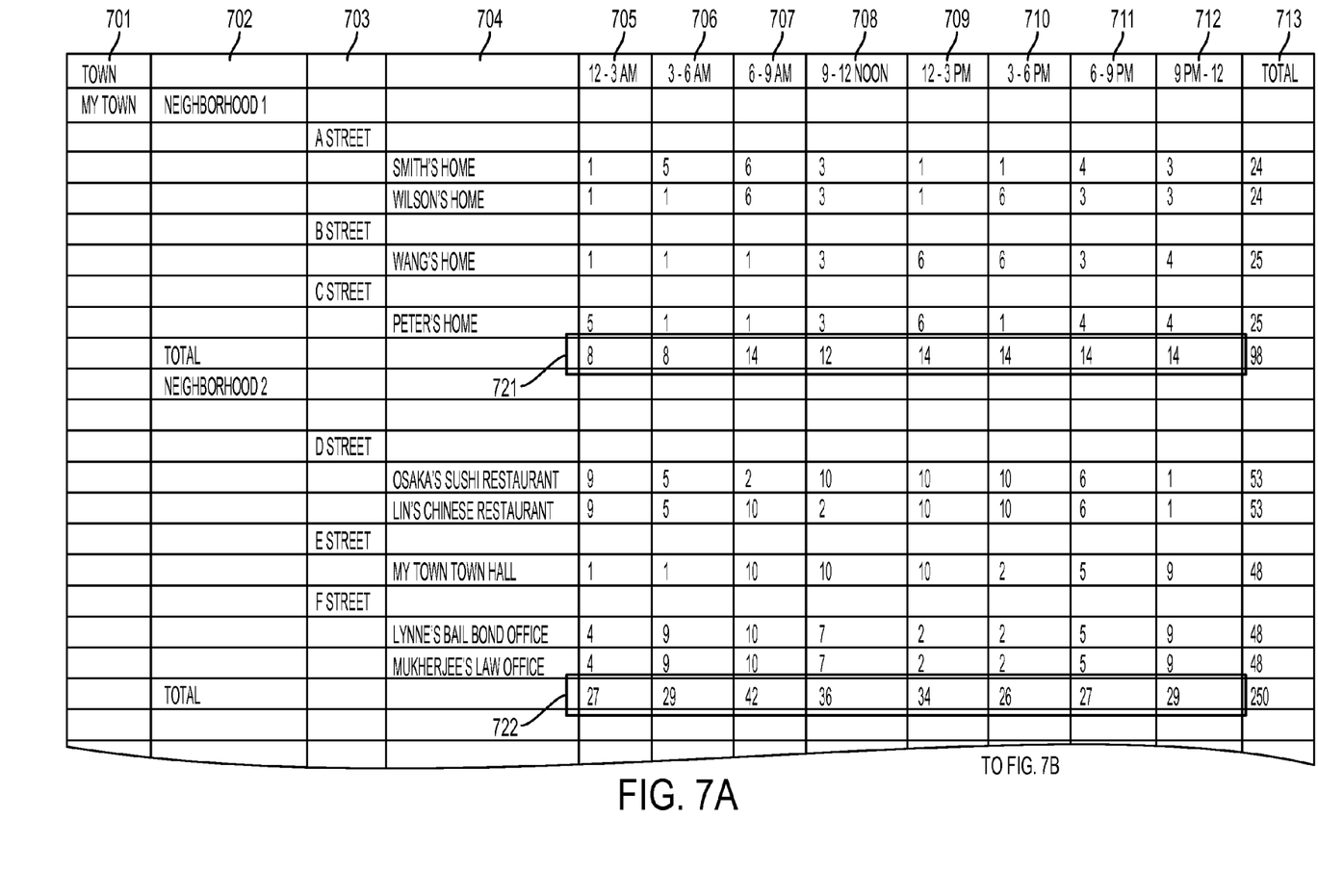
FIGS. 7A and 7B show a chart showing an electricity demand obtained using the group-based rate structure shown in FIG. 6.
Figure 7B:
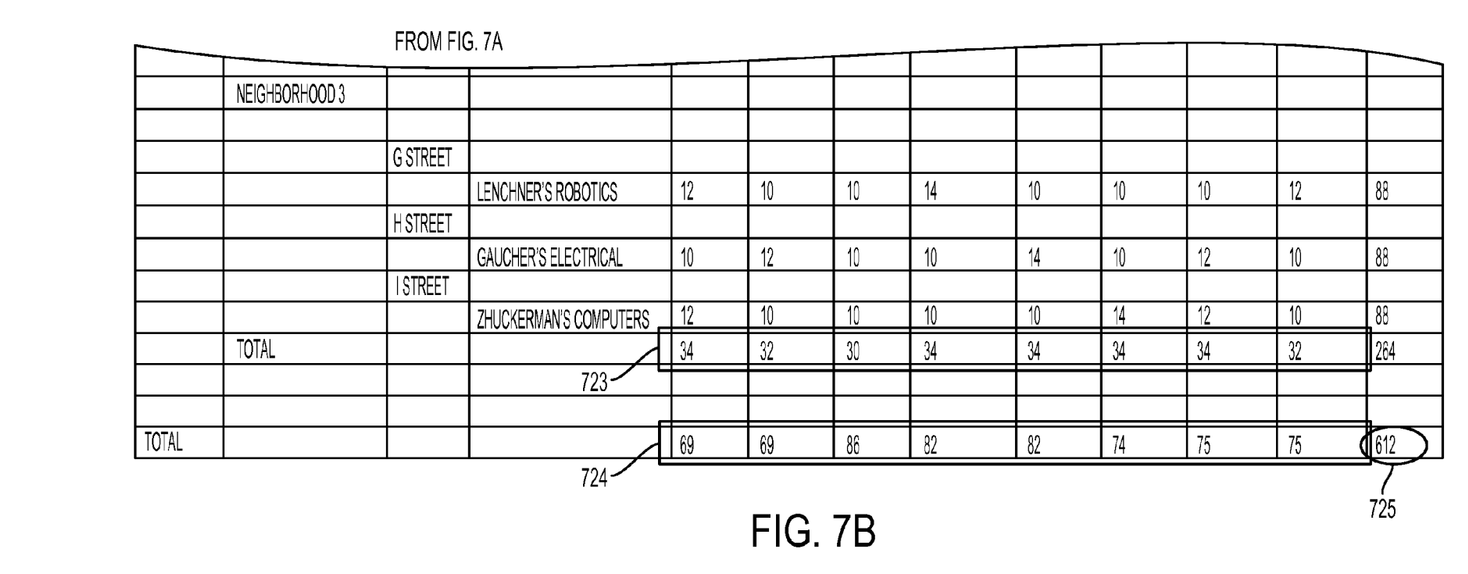

FIGS. 7A and 7B shows a chart 700 showing an electricity demand obtained using the group-based rate structure shown in FIG. 6. The hierarchy of the town is shown in the first four columns 701-704. The town is listed in first column 701 as "My Town." The neighborhoods of My Town are listed in the second column 702 as "Neighborhood 1," "Neighborhood 2," and "Neighborhood 3." Streets of each neighborhood are listed in the third column 703 and homes and/or businesses, i.e., the consumers, along each street are listed in the fourth column 704. The day is divided into eight three-hour time slots as shown in columns 705-712 and an electricity consumption of each of the consumers during these time slots is listed in the respective columns. Total electricity demand of the each consumer for the day is listed in column 713. Total electricity demand for the neighborhoods during each time slot is also shown. Total electricity demand for each time slot for Neighborhood 1 is shown in row 730. Total electricity demand for each time slot for Neighborhood 2 is shown in row 732 and total electricity demand for each time slot for Neighborhood 3 is shown in row 734. The total electricity demand for My Town for each time slot is shown in row 736. The total demand of My Town for the day is shown in the circle 725. It can be seen that the demand for each time slot for My Town (row 724) under the group-based incentive is substantially balanced.

Figure 8:
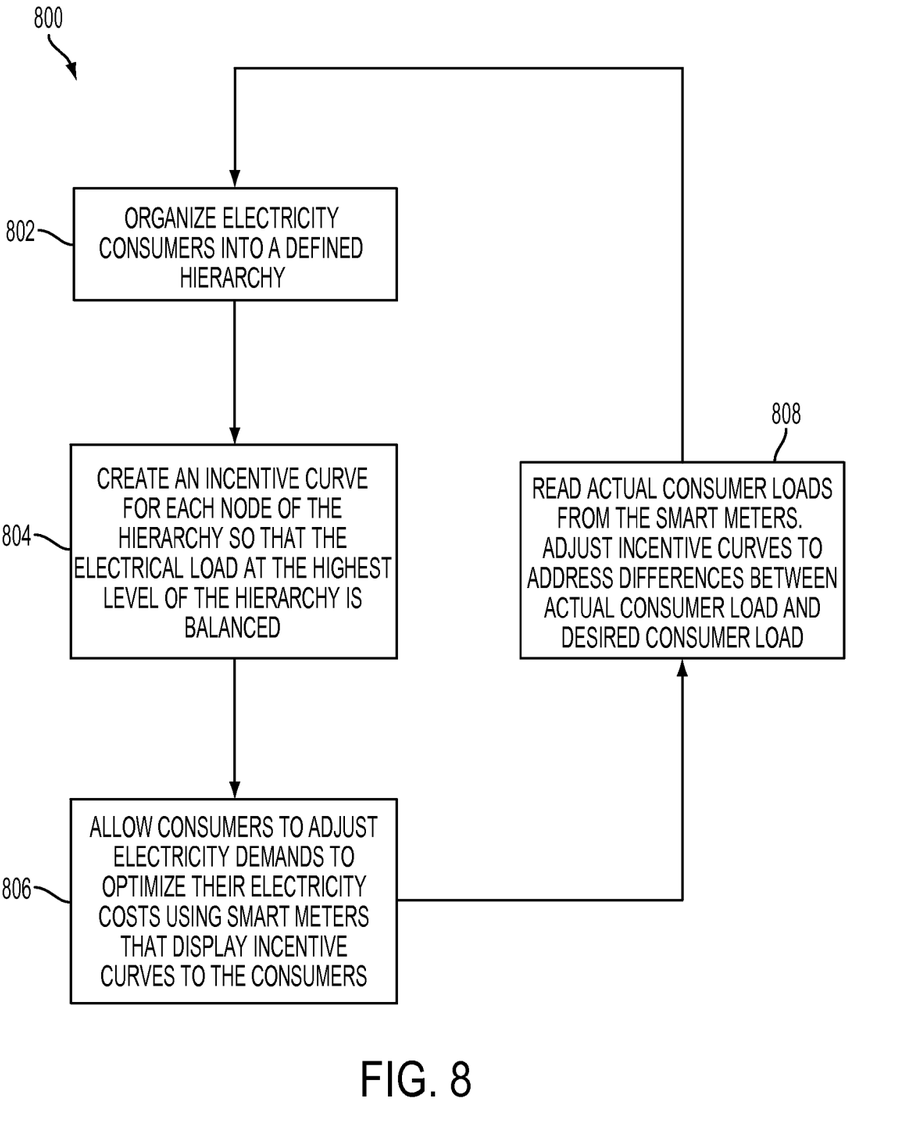
FIG. 8 shows a flowchart illustrating an exemplary method of applying a group-based incentive program of the present invention to a group of consumers.

FIG. 8 shows a flowchart 800 illustrating an exemplary method of applying a group-based incentive program of the present invention to a group of consumers. In Block 802, the consumers are organized into a defined hierarchy. The hierarchy may be selected based on a logical grouping selected by an operator. In Block 804, an incentive curve or rate structure is created for each node of the hierarchy such that the load at the first level of the hierarchy (i.e., the most general level) is balanced. The incentive curve for each node is determined so that the sum of incentive curves at a selected level is equal to the incentive curve at the related node at the next higher level of the hierarchy. In Block 806, consumers view their assigned rate structures and adjust their electricity demands accordingly to lower their electricity costs. In Block 808, the observed electricity demands of the consumers are read from the smart meters. A difference between observed demand and an expected demand may be determined and then used to alter a rate structure for a selected consumer. Behavioral adjustments made by the selected consumer in response to the altered rate structure affects the observed demand for the entire grid (i.e., for all of My Town) so that the observed total demand curve more closely approximates the desire demand curve. Alternately, adjustments to electricity use may be enforced by the corresponding smart meter to affect the observed demand at the consumer level to obtain a selected observed demand over the entire grid. After Block 808, the process returns to Block 802.

Figure 9:
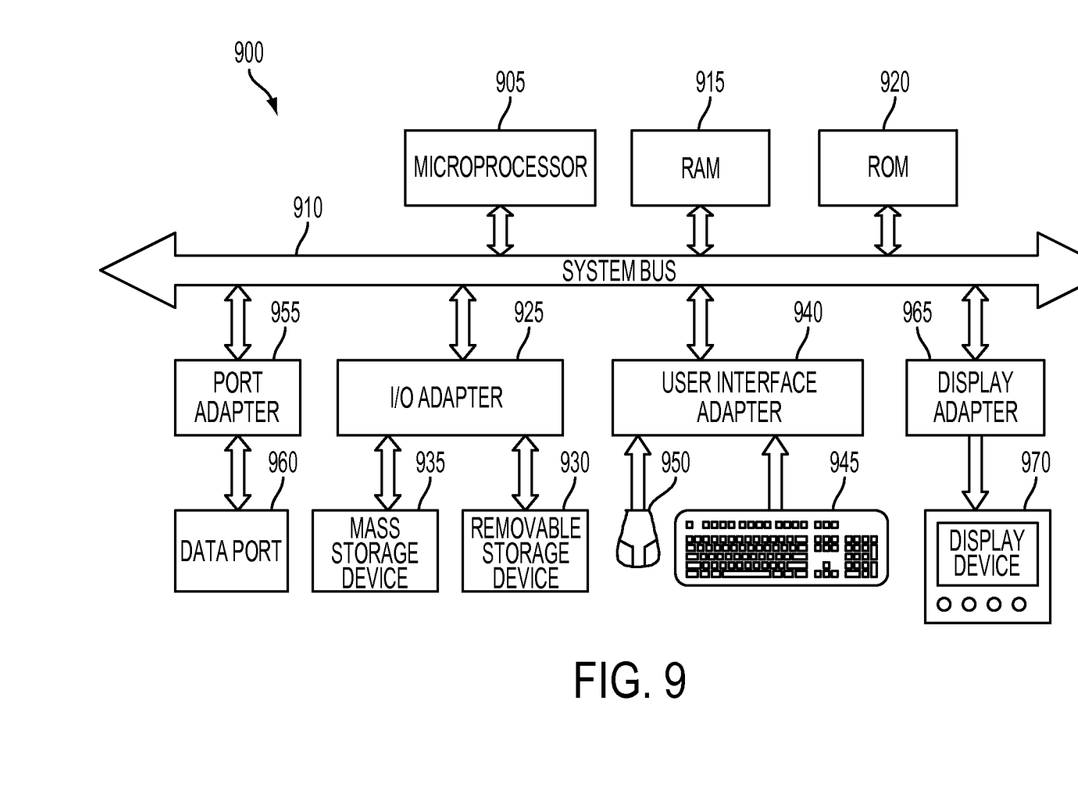
FIG. 9 is a schematic block diagram of a general-purpose computing system suitable for practicing embodiments of the present invention.

Generally, the method embodiments for implementing systematic, variation-aware integrated circuit extraction may be practiced with a general-purpose computer and the method may be coded as a set of instructions on removable or hard media for use by the general-purpose computer. FIG. 9 is a schematic block diagram of a general-purpose computing system suitable for practicing embodiments of the present invention. In FIG. 9, computing system 900 has at least one microprocessor or central processing unit (CPU) 905. CPU 905 is interconnected via a system bus 910 to a random access memory (RAM) 915, a read-only memory (ROM) 920, an input/output (I/O) adapter 925 for a connecting a removable data and/or program storage device 930 and a mass data and/or program storage device 935, a user interface adapter 940 for connecting a keyboard 945 and a mouse 950, a port adapter 955 for connecting a data port 960 and a display adapter 965 for connecting a display device 970.

ROM 920 contains the basic operating system for computing system 900. The operating system may alternatively reside in RAM 915 or elsewhere as is known in the art. Examples of removable data and/or program storage device 930 include magnetic media such as floppy drives and tape drives and optical media such as CD ROM drives. Examples of mass data and/or program storage device 935 include hard disk drives and non-volatile memory such as flash memory. In addition to keyboard 945 and mouse 950, other user input devices such as trackballs, writing tablets, pressure pads, microphones, light pens and position-sensing screen displays may be connected to user interface 940. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 930, fed through data port 960 or typed in using keyboard 945.

In view of the above, the present method embodiments may therefore take the form of computer or controller implemented processes and apparatuses for practicing those processes. The invention can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The invention may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above and illustrated in FIGS. 1-8.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiment to the invention had been described, it will be understood that those skilled in the art, both now and in the future, may make various improvements and enhancements which fall within the scope of the claims which follow. These claims should be construed to maintain the proper protection for the invention first described.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for exemplary embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of balancing a demand for electricity, comprising:
    organizing, using a processing device, consumers of the electricity into a hierarchical set of nodes including a node at a first level, the node at the first level including a plurality of nodes at a second level;
    defining an incentive rate for a node at the first level of the hierarchy;
    defining rate structures at the plurality of nodes of the second level of the hierarchy based on the incentive rate for the node at the first level;
    reading electricity demands at the plurality of nodes of the second level resulting from the rate structures at the plurality of nodes;
    summing the electricity demands at the plurality of nodes to obtain an electricity demand at the first level; and
    altering the rate structure for the plurality of nodes to incentivize consumers at the plurality of nodes of the second level to adjust energy usage, wherein the adjusted energy usage at the plurality of nodes of the second level obtains a selected electricity demand at the first level.

2. The method of claim 1, wherein the rate structures at the plurality of nodes of the second level varies with time.

3. The method of claim 1, wherein a node represents at least one of: a municipality, a zoning district; a city; a county; a neighborhood; a street; a living establishment; and a consumer.

4. The method of claim 1, further comprising enabling a smart meter at a selected node of the plurality of nodes of the second level to adjust the energy usage at the selected node based on the altered rate structure.

5. The method of claim 1, wherein the rate structure is one of continuous and discontinuous.

6. The method of claim 1, further comprising defining a balanced demand at the node of the first level of the hierarchy.

7. The method of claim 1, wherein a rate structure at one node of the second level is the same as a rate structure at another node of the second level offset in time.

8. An electrical utility system for balancing an electricity demand, comprising:
a grid configured to provide electricity to a plurality of consumers;
a processor configured to:
organize the plurality of consumers into a hierarchical set of nodes,
define an incentive rate at a node at a first level of the hierarchy,
define a rate structure at a plurality of nodes of a second level of the hierarchy, wherein a sum of incentive rates for the plurality of nodes of the second level is the same as the defined incentive rate at the first level of the hierarchy;
read electricity demands at the plurality of nodes of the second level resulting from the defined rate structure at the plurality of nodes,
sum the electricity demands at the plurality of nodes to obtain an electricity demand at the first level, and
alter the rate structure for the plurality of nodes to incentivize consumers at the plurality of nodes of the second level to adjust energy usage, wherein the adjusted energy usage at the plurality of nodes of the second level obtains a selected electricity demand at the first level.

9. The system of claim 8, wherein the rate structures at the nodes of the second level vary with time.

10. The system of claim 8, wherein a node represents at least one of: a municipality, a zoning district; a city; a county; a neighborhood; a street; a living establishment; and a consumer.

11. The system of claim 8, further comprising an electricity meter at a selected node of the second level configured to display a current rate structure to a consumer.

12. The system of claim 11, wherein the electricity meter at the selected node to adjust the energy usage at the selected node based on the altered rate structure.

13. The system of claim 8, wherein the rate structure is one of continuous and discontinuous.

14. The system of claim 8, wherein the processor is further configured to define a balanced demand at the node of the first level of the hierarchy.

15. The system of claim 8, wherein a rate structure at one node of the second level is the same as a rate structure at another node of the second level offset in time.

16. A computer program product comprising:
a non-transitory computer readable storage medium having computer readable program code embodied therewith, the non-transitory computer readable program code comprising instructions, that when executed by a computer, implement a method of balancing a demand for electricity, wherein the method comprises:
organizing consumers of the electricity into a hierarchical set of nodes;
defining an incentive rate for a node at a first level of the hierarchy;
defining a rate structure at a plurality of nodes of a second level of the hierarchy, wherein a sum of the incentive rates at the plurality of nodes of the second level is the same as the defined incentive rate at the first level of the hierarchy;
reading electricity demands at the plurality of nodes of the second level resulting from the defined rate structure at the plurality of nodes;
summing the electricity demands at the plurality of nodes to obtain an electricity demand at the first level; and
altering the rate structure for the plurality of nodes to incentivize consumers at the plurality of nodes of the second level to adjust energy usage, wherein the adjusted energy usage at the plurality of nodes of the second level obtains a selected electricity demand at the first level.

17. The computer program product of claim 16, wherein the rate structures at the nodes of the second level vary with time.

18. The computer program product of claim 16, wherein a node represents at least one of: a municipality, a zoning district; a city; a county; a neighborhood; a street; a living establishment; and a consumer.

19. The computer program product of claim 16, wherein the method further comprises enabling an electricity meter at a selected node of the plurality of nodes of the second level to adjust the energy usage at the selected node based on the altered rate structure.

20. The computer program product of claim 16, wherein the method further comprises defining a balanced demand at the node of the first level of the hierarchy.

21. The computer program product of claim 16, wherein the rate structure is one of continuous and discontinuous.

22. The computer program product of claim 16, wherein a rate structure at one node of the second level is the same as a rate structure at another node of the second level offset in time.

* * * * *